INVENTOR.
JOHN M. SLATER

INVENTOR.
JOHN M. SLATER

United States Patent Office 3,039,316
Patented June 19, 1962

3,039,316
GUIDANCE SYSTEM UTILIZING TWO-AXIS STABILIZATION
John M. Slater, Fullerton, Calif., assignor to North American Aviation, Inc.
Filed Oct. 25, 1957, Ser. No. 692,453
17 Claims. (Cl. 74—5.34)

The present invention relates to inertial guidance systems and particularly concerns guidance apparatus employing one or more inertial elements individually stabilized about two axes.

Inertial guidance apparatus has a plurality of functions. The first function is that of sensing and integrating accelerations of a vehicle to determine velocity (the first time integral of acceleration) and usually also to determine position (the second time integral of acceleration). A second function of such apparatus is the actual guidance of the vehicle which comprises the direction of the vehicle toward a predetermined destination. This function is usually achieved by detecting and correcting departures from predetermined values of velocity or position or both. The guidance apparatus is ordinarily called upon to perform an additional function, viz., furnishing flight control (autopilot) signals for the vehicle. In the case of a vehicle not equipped with inertial guidance apparatus such signals are furnished by autopilot gyros, which may be either displacement-type instruments (gyro-vertical and directional gyro) or rate instruments (airframe-fixed rate gyros) or both. But since inertial guidance apparatus by its very nature provides gyroscopic references capable of detecting changes of vehicle attitude, it is frequently convenient to rely on components of the guidance apparatus for flight control signals rather than to supply a separate set of instruments.

Inertial guidance systems typically utilize a plurality of acceleration sensing devices to measure vehicle accelerations along a set of two or more orthogonal axes and a plurality of gyroscopes to define a set of three orthogonal reference axes having some definite relation to inertial space. Inertial or unaccelerated space is in effect the space defined by the fixed stars as distinguished, for example, from the surface of the rotating earth. A computer is normally provided which takes into account earth rotation gravity and other factors in such a manner that the outputs of the acceleration sensing devices can be interpreted correctly as changes of motion of the vehicle. Then a single integration of acceleration signals will give vehicle velocity components along a set of predetermined axes and a double integration will give displacement or distance traveled with reference to such axes.

In conventional inertial systems the gyroscopes are assembled on a unitary device commonly designated as a stable element which is intended either to retain an angularly fixed (irrotational) relation to inertial space or alternatively, to rotate in space in some predetermined manner such as, for example, in synchronism with earth rotation. The acceleration sensing devices are mounted on the stable element and therefore sense accelerations in a coordinate system fixedly related to the element. The stable element, the assemblage of gyroscopes and acceleration sensing devices, is mounted as a single unit in gimbals in order to enable it to retain its orientation in inertial space completely independently of vehicle maneuvers. The gimbal mounted stable element is commonly designated a stable platform. Typical stable platforms for inertial guidance are described in an article by J. M. Slater and D. B. Duncan, "Inertial Navigation," Aeronautical Engineering Review, volume 15, No. 1, January 1956, p. 49, and the patent to Draper et al. No. 2,752,793.

The conventional arrangement has certain disadvantages, especially when application is concerned to guided missiles of the smaller sort, such as short-rage ballistic missiles and air-to-surface weapons. Such missiles are commonly long but thin. The available space for guidance equipment may be fairly long but only a few inches in diameter. Yet a stable platform is essentially a globular cluster, and to fit it into such a space calls for excessive reduction in size of the critical elements—gyros and accelerometers. For example, a typical conventional "miniature" stable platform based on gyros approximated by 5-inch spheres and accelerometers approximately by 3.5 inch spheres comes out to be 13 inches in diameter by 17 inches long, despite every effort at "squeezing." Now consider a missile in which the space for guidance and control equipment is only 8 inches in diameter. To reduce the stated platform dimensions by the factor 8/13 would reduce gyros about 2.5 inches in diameter, and accelerometers about 1.75 inches. (The inertial components have to come down in size by a greater reduction factor than the platform as a whole, because gimbal servo motors, slip rings, etc. cannot be scaled down in simple proportion to the overall dimension reduction.) Inertial components of this extremely small size would be marginal in accuracy and excessively difficult to make. But in this hypothetical example, by using the system of the present invention we could readily fit the set of three 5-inch gyros and three 3.5-inch accelerometers into the available 8-inch diameter space.

The present invention overcomes the above stated disadvantages and achieves new advantages by provision of a guidance system which utilizes separate two-axis stabilization of relatively independently mounted inertial components. As in previous guidance systems a plurality of accelerometers which may provide signals indicative of acceleration, velocity or distance are so mounted as to maintain a known or predetermined relation to inertial space. Thus, the signals provided by the accelerometers will provide information concerning acceleration, velocity or position in a predetermined or space fixed coordinate system. Contrary to previous systems wherein all accelerometers are mounted on a single integral gimbal mounted element, each of the accelerometers of the present invention is individually mounted with but two degrees of freedom relative to the vehicle about a pair of mutually orthogonal axes each of which is perpendicular to the sensing axis of its individual accelerometer. Basically each accelerometer is independent of each other accelerometer and is individually stabilized by being mounted upon its own two-axis stable platform. Each such two-axis platform is provided by one of three mutually orthogonal two-axis gyroscopes each of which is itself mounted for two degrees of freedom relative to the airframe. The gyroscopes have no applied torques except for trimming and thus tend to remain angularly fixed in inertial space. To the extent that stray torques are eliminated from the gyros, each gyro will stabilize the accelerometer mounted thereon along one of the three space axes defined by the respective gyro spin axes. Thus, the complexity and inflexibility of a single unitary three-axis stable platform is avoided without the need for directly mounting the inertial components to the airframe.

It is an object of this invention to provide an improved guidance system.

A further object of the invention is to facilitate the packing of the several components of an inertial guidance system.

Another object is to improve the stabilization of one or more accelerometers.

Still another object is the provision of a guidance system in which the disadvantages of a gimbal mounted unitary three-axis stable platform are obviated.

A further object is the stabilization of a plurality of independently mounted accelerometers.

Another object is the independent stabilization of each of a plurality of mutually orthogonal accelerometers which are mounted for relative motion.

These and other objects of the invention will become apparent from the following description taken in connection with the accompanying drawings, in which FIG. 1 illustrates an exemplary embodiment of this invention.

Figure 6:
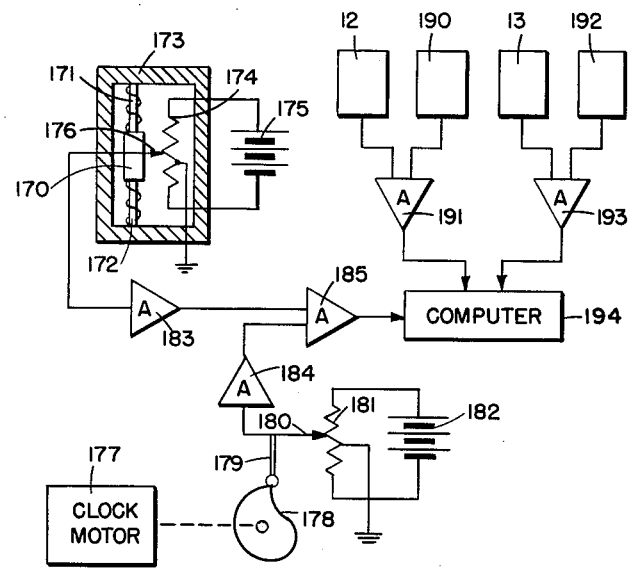
Figure 7:
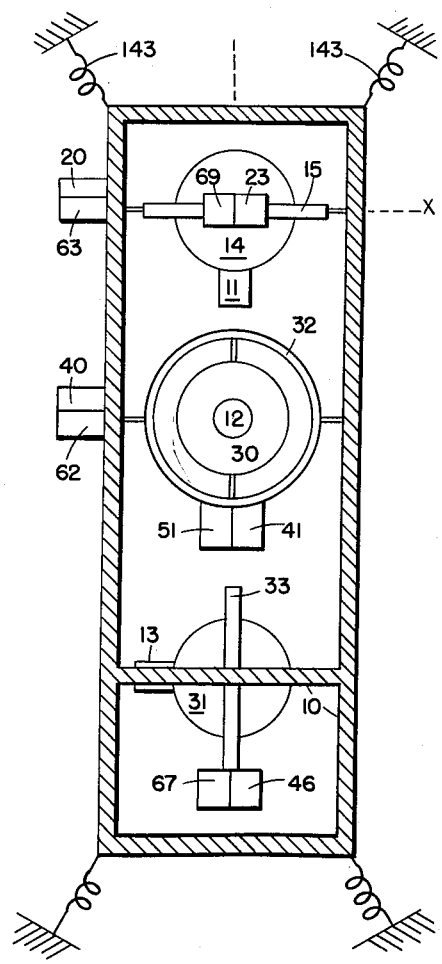

FIG. 6 comprises a schematic illustration of one of the accelerometers of this invention and a programmed correction therefor, and FIG. 7 illustrates an exemplary arrangement of the system.

Figure 1:
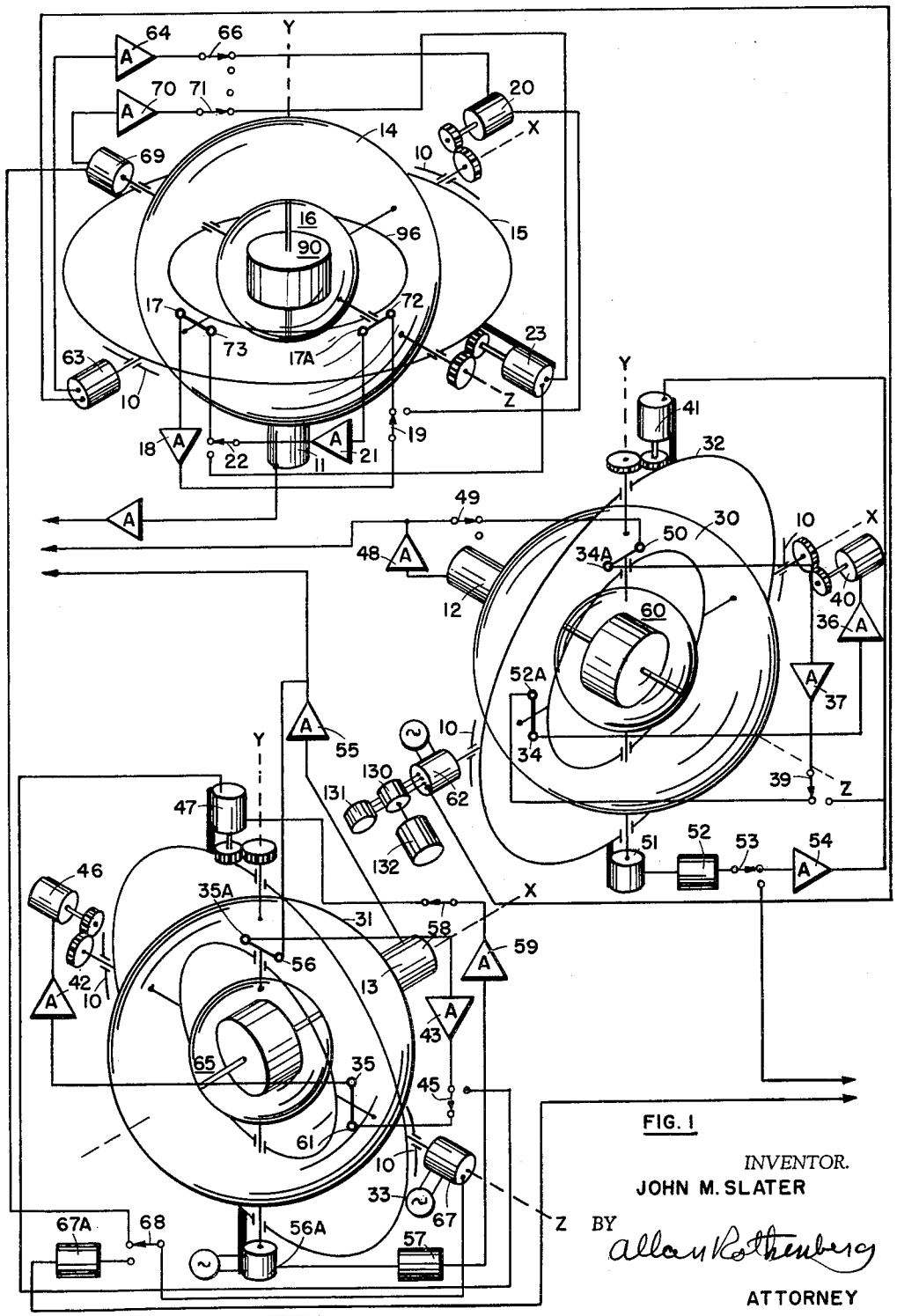

Referring now to FIG. 1, the inertial elements of this invention are mounted for two degrees of freedom on a base member 10 which may be the airframe itself or a separate frame, plate or other support which is attached to the airframe by means of shock mounts, if desired, in such a manner as to preserve a substantially fixed orientation of the base member relative to the airframe. On the base member 10 are mounted in any convenient arrangement a plurality of two-axis stabilized accelerometers 11, 12 and 13. It is to be understood that the term accelerometers as used herein includes devices for producing signals in accordance with linear acceleration and also single or double integrating accelerometers commonly known as velocity meters and distance meters for producing signals indicative of velocity and distance. In FIG. 1, there is shown a coordinate system having axes designated as X, Y, Z respectively. Thus, accelerometer 11 may be termed the Y axis accelerometer since it has its sensing axis aligned with the Y axis and is thus adapted to provide signals indicative of acceleration, velocity or distance in the direction of the Y axis. During flight accelerometer 11 thus must have its sensing axis maintained in alignment with the Y axis shown in FIG. 1. The coordinate system defined by the X, Y and Z axes is a space fixed coordinate system and is adapted to maintain its initial orientation in space throughout the maneuvers and travel of the vehicle. It will be seen therefore that the missile pitch, roll and yaw axes will be aligned with the space fixed X, Y and Z axes during or prior to launching of the vehicle in a vertical attitude assuming, of course, that the Y axis is vertical at the time of launching. Since it is desired to utilize Y-axis accelerometer 11 to provide acceleration signals along the Y axis of the fixed coordinate system stabilization of the accelerometer about its sensing axis is of no consequence. It is necessary solely to prevent rotation of the accelerometer about each of two axes (X, Z) which are angulated with respect to each other and with respect to the sensing axis of the accelerometer. To this end, the accelerometer 11 is mounted on a two-axis stabilized platform for motion relative to the airframe about each of the axes X and Z which are othogonal to each other and to the Y axis.

The two-axis platform for accelerometer 11 is provided by the gyro case or frame 14 which is mounted to base member 10 for two degrees of freedom. The case 14 is pivotally mounted about the two axes by being pivoted about axis Z to followup gimbal 15 which in turn is pivoted to base member 10 about the X axis. Stabilization of the case 14 about the X and Z axes during flight is provided by a two-axis gyroscope 16 within the case 14 together with a pickoff and servo system for detecting and reducing misalignment between case 14 and the two stable axes defined by the gyro 16.

The gyroscope 16, more particularly described below, includes a rotor having its spin axis aligned with the Y axis and restrained to the case 14 about the X and Z axes. The gyro 16 thus provides a space fixed reference about the X and Z axes. During flight, a pickoff 17 detects angular deviation of the case 14 about the space fixed X axis defined by the gyro and sends a signal via amplifier demodulator 18 and two-position switch 19 to the base mounted X axis servo motor 20 which rotates follow-up gimbal 15 and thus case 14 about the X axis relative to base member 10 in a sense to reduce the detected deviation. All switches are shown in pre-flight or caging position. Pickoff 17a detects angular deviation of the case 14 about the space fixed Z axis defined by the gyro and sends a signal through amplifier demodulator 21 and switch 22 to Z axis servo motor 23 mounted on gimbal 15 to angularly displace case 14 relative to gimbal 15 in a sense to reduce detected deviation. Thus, the case 14 is in effect a two-axis stable platform which has its angular spatial orientation about the X, Z axes fixed by the gyro 16. Since the case is always aligned with the spin axis of the gyro, the accelerometer 11 which is fixed to the case and initially aligned with the case and gyro spin axis is stabilized in space during vehicle flight about the axes X and Z which are perpendicular to the accelerometer sensing axis.

The X and Z axis accelerometers 12, 13, together with the in-flight stabilization thereof are each essentially similar to the described Y axis accelerometer 11 and its stabilizing apparatus. The three assemblies, of course, differ in spatial orientation, the Z axis accelerometer 12 and the spin axis of its associated gyro 60 being aligned along the Z axis while accelerometer 13 and the spin axis of its associated gyro 65 are aligned along the X axis. The accelerometers 12 and 13 are carried by gyro cases or two-axis stable platforms 30, 31 which are pivotally mounted to base member 10 by means of follow-up gimbals 32, 33 which in turn are pivoted to base member 10 about axes X and Z respectively. Pickoffs 34, 34a of the Z axis gyro 60 provide signals which are fed through amplifier demodulators 36, 37, and switch 39 to the follow-up gimbal servo motors 40 and 41 in order to maintain alignment of case 30 about the X, Y axes defined by Z axis gyro 60 mounted in case 30. Similarly, the pickoffs 35, 35a for stabilizing accelerometer 13 feed signals through amplifier demodulators 42, 43 and caging switch 45 to servo motors 46, 47 in order to preserve the spatial orientation of the two-axis platform 31 about the Z and Y axes defined by gyro 65 mounted in case 31. Thus, it will be seen, as described in connection with accelerometer 11, that accelerometers 12 and 13 are each stabilized about the X, Y and Z, Y pairs of axes respectively and caused to follow up the spin axis of the two-axis gyros respectively carried in cases 30 and 31 by means of the gimbal servo systems.

While the vehicle is on the ground awaiting launching, it is desirable to preserve the orientation of the platform axes relative to the earth. For this reason the gyros are electrically caged and the case of each gyro is also caged in order to constrain both the gyro and the accelerometer to a predetermined orientation relative to the earth which can be measured by suitable means (not shown) relative to a fixed base line on the ground. At launching, the system is uncaged by freeing both gyro and case whereby the two-axis platform will preserve its initial spatial orientation irrespective of any maneuvers of the vehicle by means of the above described pickoff and servo system.

The caging of the gyros is effected when each of the switches is in the position shown in FIG. 1. At launching, each switch is thrown to its other position.

Since the vehicle before launching may be slightly off vertical, the caging is arranged to provide gravity leveling for the apparatus independent of vehicle level while azimuth orientation is maintained by caging the gyros to the vehicle in azimuth. The horizontal-spin-axis X and Z, gyros 65, 60, are leveled under control of the X and Z accelerometers 13, 12 about the Z and X axes respectively. The one leveled axis of each gyro in turn controls its own case and follow-up gimbal about its one leveled axis. The case 31, 30 of each of the X and Z gyros is caged in azimuth (about the Y axis) to the vehicle and the gyros are azimuth caged to the respective cases. The case 14 of Y axis gyro 16 is slaved to the X and Z axis gyros so as to be maintained vertical and the Y gyro is caged to its case. No control is necessary about the third (i.e. spin) axis of each of the two-axis platforms.

The leveling of the system prior to launching is based upon the sensing of gravitational acceleration by the accelerometers which provide an output only when tilted from the horizontal. Thus, the X axis tilting of case 30 of Z axis gyro 60 will cause the accelerometer 12 to provide an output signal indicative of the sense of such tilt. This signal is fed through amplifier 48 and switch 49 (in the caged position shown) to Y axis torquer 50 which torques the gyro 60 about the Y axis to cause precession thereof about the X axis in a sense to reduce the tilt of case 30. Case 30 and follow-up gimbal 32 are caged to gyro 60 about the X axis by X pickoff 34 which feeds a signal through amplifier demodulator 36 to servo motor 40 to rotate gimbal 32 and case 30 about the X axis in a sense to reduce deviation of the case and gimbal relative to the gyro. Thus, the gyro 60, case 30 and gimbal 32 are all leveled about the X axis by accelerometer 12.

Y axis (azimuth) caging of gyro 60 is effected by synchro pickoff 51 which senses relative motion of case 30 and gimbal 32 about the Y axis and sends a signal through locked synchro 52, switch 53, and amplifier demodulator 54 to servo motor 41 which rotates the case 30 relative to follow-up gimbal 32 (and base member 10) about the Y axis in a sense to reduce deviation detected by synchro 51. Thus, the case 30 is azimuth caged to the vehicle. The gyro 60 is azimuth caged to case 30 by the feeding of a signal from Y axis pickoff 34a through amplifier demodulator 37 and switch 39 to X axis torquer 52A which torques the gyro to cause precession thereof about the Y axis in a sense to reduce detected azimuth deviation of the gyro relative to case 30.

The leveling about the Z axis is controlled by the X axis accelerometer 13 which upon tilting of the case 31 of gyro 65 about the Z axis will feed a signal through amplifier 55 to Y axis torquer 56 which torques the gyro to cause precession about the Z axis in a sense to reduce the tilt of gyro 65 about the Z axis. The case 31 and followup gimbal 33 are caged to the Z axis of gyro 65 by Z pickoff 35 which sends a signal through amplifier demodulator 42 to servo motor 46 to rotate gimbal 33, and thus case 31, about the Z axis in a sense to reduce the deviation between the gyro and case 31 which is detected by pickoff 35. Thus, the gyro 65, case 31 and gimbal 33 are all leveled about the Z axis under control of accelerometer 13. Case 31 is azimuth slaved to base member 10 by synchro pickoff 56A which detects azimuth deviation of case 31 relative to the vehicle and gimbal 33 and feeds a signal through locked synchro 57, switch 58, and amplifier demodulator 59 to servo motor 47 to rotate case 31 about the Y axis in a sense to reduce azimuth deviation detected by synchro 56A. Gyro 65 is azimuth caged to case 31 by the feeding of a signal from Y axis pickoff 35a through amplifier demodulator 43 and switch 45 to Z axis torquer 61 which torques the gyro to cause Y axis precession in a sense to reduce the azimuth deviation of the gyro relative to the case. Thus, the gyro 65, case 31 and gimbal 33 are all azimuth caged to the base member 10.

Leveling of accelerometer 11 is effected by feeding a signal from X axis synchro pickoff 62 of gyro 60 to slave synchro 63 on the X axis of gyro 16. Since synchro 63 together with amplifier demodulator 64 and switch 66 effects operation of servo motor 20 to rotate followup gimbal 15, and thus case 14, about X in accordance with the X axis leveling signal from master synchro 62. Case 14 and gimbal 15 are similarly leveled about the Z axis under control of a signal from master synchro 67 which provides a signal indicative of the Z axis position of gimbal 33 relative to base member 10. The Z-axis leveling signal from synchro 67 is fed through switch 68 to slave synchro 69 of the Y axis case 14. Synchro 69 together with amplifier demodulator 70 and switch 71 controls servo motor 23 to rotate the case 14 about the Z axis in accordance with the Z axis position of gimbal 33. Gyro 16 is caged to case 14 about the X axis by the feeding of a signal from X axis pickoff 17 through amplifier demodulator 18 and switch 19 to Z axis torquer 72 which torques gyro 16 to cause precession about the X axis in a sense to reduce the detected deviation of the gyro relative to its case. Gyro 16 is similarly slaved to case 14 about the Z axis by the feeding of a signal from pickoff 17a through amplifier demodulator 21 and switch 22 to X axis torquer 73 which torques the gyro to cause precession about the Z axis in a sense to reduce deviation detected by pickoff 17a. Thus, the Y axis accelerometer 11 is maintained in a vertical position under control of accelerometers 12 and 13.

It is to be understood that all of the caging switches are shown in the caged or prelaunch position thereof. At launching all switches are simultaneously thrown to the other position thereof whereby the gyro slaving loops are disengaged and the gyros thereafter remain angularly fixed in inertial space with the case of each being servoed to alignment with the associated gyro spin axis as previously described. Roll, yaw and pitch control signals may be obtained during flight from the synchro pickoffs 51, 67 and 62 respectively as described below. It will be understood that, due to inevitable imperfections in the gyros, they will eventually drift in an unpredictable manner away from the initial orthogonal configuration. However, with presently available high-precision gyros the drift rate, even under the high acceleration conditions of ballistic missile flight, is of the order of 0.1 degree per hour or less. Thus, in the few minutes required for the missile guidance operation, the drift away from orthogonality is negligibly small.

Figure 2:
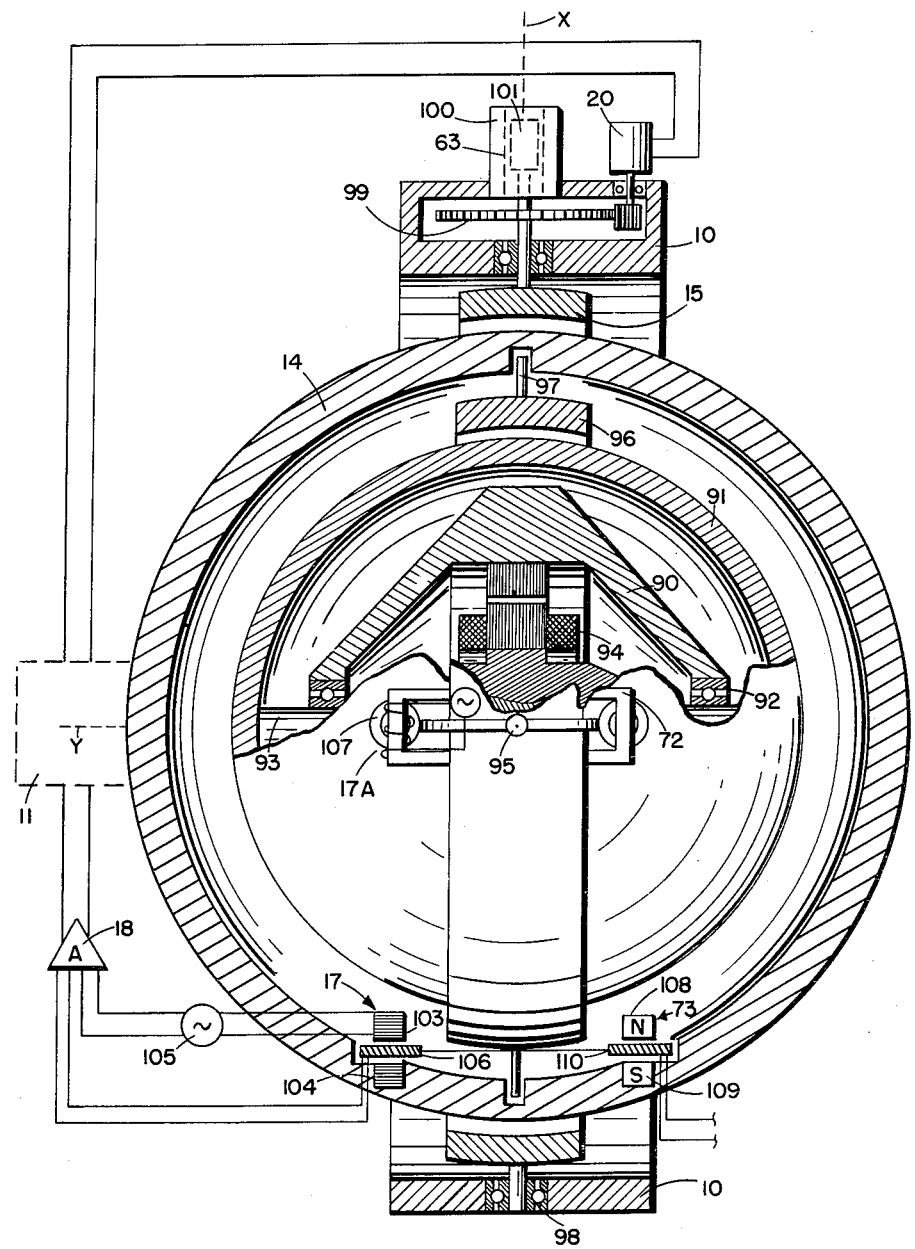
FIG. 2 depicts details of a single two-axis platform.

Referring now to FIG. 2 which illustrates the details of an exemplary form of one of the two-axis stable platforms such as that which carries accelerometer 11 of FIG. 1, the two-axis gyro 16 may comprise a rotor 90 hermetically sealed within a spherical rotor case 91 and mounted by ball bearings 92 to a shaft 93 fixed within rotor case 91. A centrally located motor 94 is provided to drive rotor 90 about the Y axis. The rotor case 91 is mounted by bearings 95 in a gimbal ring 96 for rotation relative to the ring 96 about the Z axis. Ring 96 is mounted to the gyro case 14 for rotation about the X axis by bearings 97. The gyro case 14 is pivoted to followup gimbal 15 for rotation about the Z axis. The followup gimbal 15 is pivotally mounted to base member 10 for rotation about the X axis in bearings 98. Bearings 95 and 97 may be of pivot-and-jewel, liquid lubricated, or other low friction type and the space between case 91 and the spherical outer case 14 may be filled with a dense flotation liquid to take most of the load off the bearings. It is understood that the described two-axis gyro is of a type known in the art and contains nothing that is novel in itself.

Servo motor 20 is fixed to base member 10 and drives through gearing 99 the gimbal 15 and case 14 for rotation about the X axis. Synchro 63 includes a stator 100 secured to base member 10 and a rotor 101 fixed to the shaft of gimbal 15. It is to be understood that the shaft which pivotally mounts case 14 to gimbal 15 is similarly provided with a servo motor 23 and synchro 69 (FIG. 1) which may be identical to servo motor 20 and synchro 63. Servo motor 23 and synchro 69, however, will be fixed to gimbal 15 and have the gearing and rotor thereof respectively fixed to the Z axis pivot shaft of case 14 as indicated in FIG. 1. The gyro has similar X and Z axis pickoffs 17 and 17a which may be of any suitable type and as shown comprise a pair of spaced elongated laminated soft-iron cores 103, 104 fixed to the case 14 (for pickoff 17). The cores are provided with series wound coils excited from a source of A.-C. current 105 so as to provide elongated magnets having adjacent magnetic poles of opposite polarity at any instant. A flat coil 106 is fixed to gimbal 96 for rotation therewith about X-axis intermediate the cores 103 and 104. The oppositely poled magnetic poles of cores 103 and 104 thus generate oppositely directed fluxes through diametrically opposite portions of the flat coil 106. At null position these oppositely directed fluxes are in effect algebraically summed in coil 106 and no current flows therein. If coil 106 be displaced from its null position, the flux in one of the two diametrically opposite portions thereof will be greater than the flux across the other of such portions and a current will be induced in coil 106 in accordance with the difference between such flux portions. The current will have a magnitude and phase relative to the phase of source 105 which are indicative of the magnitude and sense of the displacement of the flat coil 106. The output of coil 106 is fed to amplifier demodulator 18 which is phase referenced from source 105 and provides as the output thereof a D.-C. signal having magnitude and phase indicative of the amount and direction of rotation of gimbal 96 relative to case 14 about the X axis. Z axis pickoff 17a similarly comprises a flat coil 107 mounted to rotate about the Z axis together with the pivot shaft of rotor case 91. The flat coil 107 is disposed between a pair of elongated cores only one of which is shown. The cores of pickoff 17a are secured to gimbal 96. The electrical circuitry of the two pickoffs 17, 17a and of each of the other pickoffs are identical. Upon displacement of the rotor 90 and shaft 93 relative to gimbal 96 about the Z axis an A.-C. signal indicative of the magnitude and sense of such displacement appears in coil 107 from whence it is fed to amplifier demodulator 21 of FIG. 1.

The control torquers 72 and 73 are similar in appearance to the pickoffs. X axis torquer 73, for example, may comprise a pair of permanent magnets 108, 109 which are fixed to case 14 and have adjacent magnetic poles of opposite polarity. A flat coil 110 fixed to gimbal 96 for rotation therewith about the X axis is located between the cores 108 and 109 and supplied with a D.-C. control torque signal. Thus, a D.-C. magnetic flux is set up in the coil 110 by the control signal applied thereto and will create a force tending to align the center of the coil with the flux flowing from one core to the other core at a selected end of the core pair. For example, with a control torque signal of one polarity in coil 110 the coil will move upwardly out of the plane of the paper toward the upper ends of cores 108 and 109 labeled N and S respectively. With a control signal of opposite polarity in coil 110, the coil will move downwardly into the plane of the paper toward the ends of cores 108 and 109 which are south and north respectively. The Z axis torquer 72 is identical except for orientation to torquer 73 and may comprise a flat coil secured to the shaft which pivotally mounts rotor case 91 to gimbal 96 about the Z axis and a pair of permanent magnets secured to gimbal 96.

In normal operation X axis displacement of gimbal 96 relative to case 14 is detected by pickoff 17 which feeds its pickoff signal through amplifier demodulator 18 to energize servo motor 20 in a direction and amount in accordance with the detected X axis rotation. Through gearing 99, motor 20 rotates followup gimbal 15 relative to base member 10. Rotation of gimbal 15 effects rotation of case 14 through the Z axis pivot therebetween and thus brings about alignment of the case 14 about the X-axis of gimbal 96. Accelerometer 11 or any other object to be stabilized is attached to case 14 and is thus maintained in constant alignment relative to the gyro spin axis. Similarly, pickoff 17a detects rotation of the rotor spin axis relative to gimbal 96 about the Z axis and feeds through amplifier demodulator 21 the signal to servo motor 23 which is mounted on followup gimbal 15.

Servo motor 23 rotates case 14 relative to gimbal 15 about the Z axis. Rotation of case 14 effects Z axis rotation of gimbal 96 by virtue of the X axis pivot therebetween in a sense to bring about alignment of gimbal 96 and case 14 with a rotor case 91. Thus, the accelerometer 11 or any other object to be stabilized which is attached to case 14 is aligned with the gyro spin axis about the Z axis.

Figure 3:
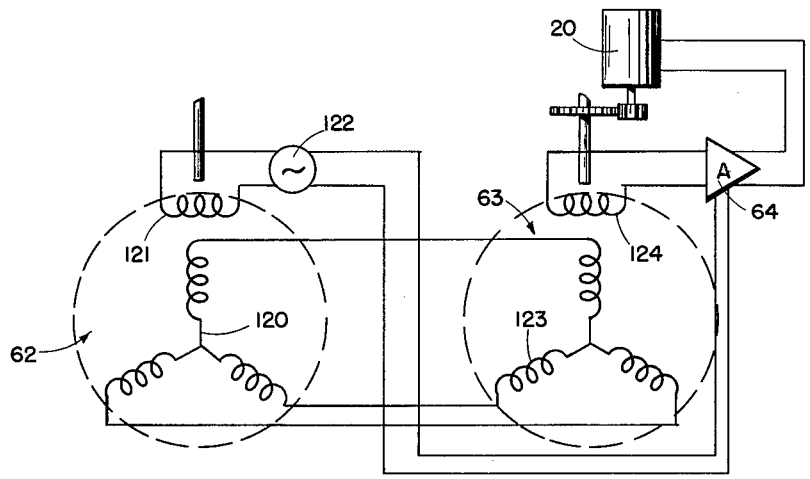
FIGS. 3, 4 and 5 show several synchro systems which may be utilized in the invention.

FIG. 3 illustrates a typical synchro servo system such as that comprising master synchro 62, slave synchro 63 and servo motor 20 of FIG. 1. This conventional synchro servo system may comprise a three-phase stator coil 120 secured to the base member 10 and a rotor coil 121 energized by an A.-C. source 122 and secured to the X axis pivot shaft of the followup gimbal 32, for example. The signal induced in stator coils 120 is applied to the stator coils 123 of synchro 63. Stator coils 123 may be fixed to the base member 10 and will thereby induce in rotor coil 124 of synchro 63 a signal indicative of the angular position of rotor 121. The signal from rotor coil 124 is applied to amplifier demodulator 64 which is phase referenced from source 122 to provide a D.-C. signal to drive servo motor 20. Servo motor 20 rotates gimbal 15, and thus rotor 124 secure thereto, in a sense to null the output of rotor coil 124. Thus, the shaft of rotor coil 124 (the X axis shaft of gimbal 15, for example) is slaved to the shaft position of rotor 121 about the X axis.

Figure 4:
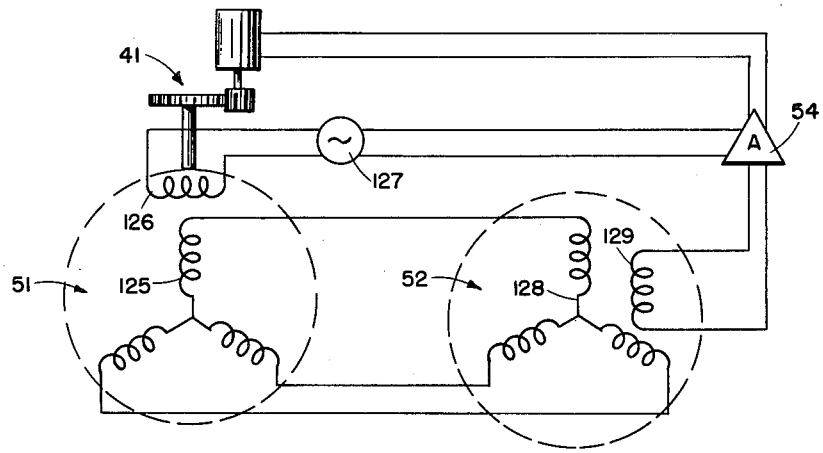

A typical synchro caging loop as indicated in FIG. 4 may comprise a pickoff synchro 51, locked synchro 52, amplifier demodulator 54 and servo motor 41 of the Z gyro of FIG. 1. Synchro 51 may include a three-phase stator coil 125 which is secured to gimbal 32 and a rotor 126 secured to the Y axis pivot shaft which mounts case 30 to gimbal 32. Rotor coil 126 is energized by a suitable A.-C. source 127. Relative angular displacement of the stator and rotor will energize the three-phase stator coil 128 of locked synchro 52 in accordance with such relative motion. Locked synchro 52 is substantially similar to the other synchros but differs therefrom in having its rotor coil 129 mechanically locked to the stator coils thereof. The locked synchro is thus in effect a three-phase to one-phase converter and provides a signal in its rotor coil 129 having a phase and magnitude indicative of the sense and amount of relative motion between rotor 126 and stator 125. The signal from locked rotor 129 is fed through amplifier demodulator 54, phase referenced from source 127, to provide a D.-C. control signal to servo motor 41. The servo motor 41 rotates case 30 relative to gimbal 32 and thus also rotates rotor 126 relative to stator 125. The rotation is such as to null the output of locked rotor 129 to thereby cease driving the servo motor at the null position of stator 125 relative to rotor 126. It is to be noted that any suitable angular pickoff such as, for example, a conventional E pickoff may be utilized in place of their pair of synchros 51, 52 which are functionally the same. However, since the three-phase synchros are required for the slave circuits, synchros on all axes are shown herein for the sake of uniformity.

Since a guidance system, in addition to providing acceleration derived signals, is frequently required to provide attitude control signals, a suitable one or more of the two-axis stable platforms may be utilized for this purpose. A pitch control signal indicative of the angular deviation of the base member 10 and thus of the missile itself about the X axis may be obtained from synchro 62 having the rotor thereof fixed to followup gimbal 32 for rotation therewith about the X axis and the stator thereof fixed to base member 10. The pitch attitude pickoff signal may be modified in differential synchro 130 under control of a programmed pitch signal derived from programmer 132. The three-phase output of synchro 130 is converted to a single phase signal by locked synchro 131 as described hereinafter. It is assumed, as is generally the case in practice, that the vehicle attitude control maintains a sufficiently small deviation of the vehicle attitude to permit programming of attitude about the space fixed axes.

While in a general case the vehicle will be programmed for maneuvers about all three axes, in a ballistic missile of the type here under consideration, no change in yaw or roll attitude may be necessary or desirable since the trajectory will simply comprise a vertical ascent and predetermined change in pitch in order to place the missile in the proper ballistic path. Thus, the roll and yaw attitude control signals are respectively derived from pickoff synchros 51 and 67 and locked synchros 52 and 67a on and the Z and X axis platforms. Synchro 51 as indicated has the stator and rotor thereof fixed to gimbal 32 and case 30 respectively for relative pivotal motion about the Y axis. Synchro 67 has the stator and rotor thereof fixed to base member 10 and gimbal 33 respectively for relative pivotal motion about the Z axis. Thus, the attitude control signals derived from synchro pickoffs 62, 51 and 67 will be respectively indicative of deviation of the base member 10 and thus of the vehicle itself about the space fixed axes X, Y and Z respectively. These signals may be fed to any suitable attitude control apparatus such as aerodynamic surfaces, jet vanes, movable rocket motors or the like (not shown) to change the vehicle attitude in a sense to minimize detected deviation as is well known to those skilled in the art.

Figure 5:
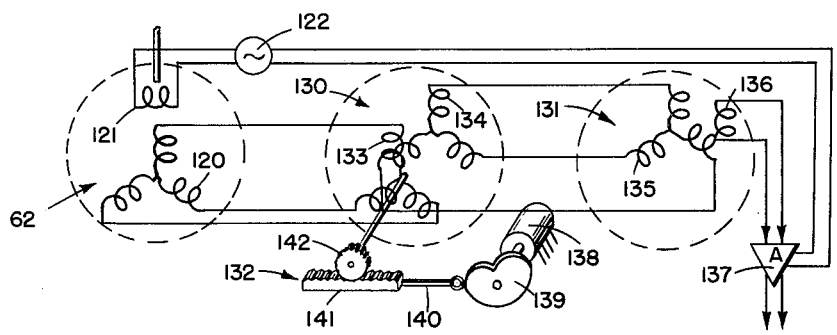

An exemplary pitch program arrangement utilizing three-phase synchros is illustrated in FIG. 5 and may include the pickoff or master synchro 62, differential synchro 130, locked synchro 131, and pitch programmer 132 of FIG. 1. The three-phase stator coils 120 of synchro 62 feed a three-phase signal to three rotor coils 133 of synchro 130. Coils 133 are inductively coupled to the respective coils of a three-phase stator 134 which are in turn coupled to the three-phase coils 135 of locked synchro 131 which has its rotor 136 inductively coupled to coils 135 and mechanically fixed with respect thereto. The output of locked rotor coil 136 is fed to an amplifier demodulator 137 phase referenced from source 122 to provide as the amplifier output a pitch control signal having a phase and magnitude indicative of the X axis deviation of the vehicle from the gyro defined X axis. The programmed pitch attitude signal is added to the pitch deviation detected by synchro 62 by means of the rotation of three-phase rotor 133 under control of pitch programmer 132. The programmer 132 which may conveniently comprise any one of a number of such devices known to those skilled in the art is illustrated as including a clock motor 138 driving at fixed speed a cam 139 which is cut in accordance with the desired time variation of vehicle attitude about the X axis. Cam 139 drives via cam follower 140 a rack 141 which in turn rotates gear 142 which is secured to the shaft of three-phase rotor 133. This is basically a conventional arrangement which is utilized in order to avoid mounting the pitch programmer at the gyro mounting ring itself. The output of amplifier demodulator 137 is the algebraic sum of the shaft rotation of rotor 121 and rotor 133 which thus imposes the programmed position signal upon the pitch control signal derived from synchro 62.

One of the primary advantages of the present invention is the flexibility of arrangement of the several components thereof. However, for purposes of exposition there is schematically depicted in FIG. 7 one of the many possible arrangements which enables the apparatus to be packaged in a cylindrical form such as may be most convenient in a vehicle of cylindrical configuration. The base member or mounting frame 10 may be of tubular form as indicated and mounted to the vehicle by springs or shock mounts 143 so as to preserve the orientation of the base member 10 relative to the vehicle. The Y axis gyro case 14 is mounted in followup gimbal 15 for pivotal motion about the Z axis while the followup gimbal 15 is mounted to base member 10 for rotation about the X axis. The case of Z axis gyro 30 is pivoted to followup gimbal 32 about the Y axis while the gimbal 32 is pivoted to base member 10 about the X axis. Case 31 of the X axis gyro is pivoted about the Y axis to followup gimbal 33 which is pivoted to the base member 10 about the Z axis.

The accelerometers 11, 12 and 13 are stabilized along the coordinate axes of a space fixed system and thus will be subject to varying components of gravitational acceleration as the vehicle travels along its chosen path and the earth rotates. Since the accelerometer cannot distinguish between gravitational acceleration and those accelerations due to the vehicle motion which is to be sensed, it is desirable to correct the output signal derived from the accelerometer. The gravitational acceleration components sensed by the accelerometer will vary with altitude, earth rotation and horizontal distance. Since the flight path and velocity of the missile are predetermined, the time variation of the gravitational correction with altitude, earth rotation and horizontal distance may be calculated and programmed. Such programming of gravity correction may take any one of a number of forms, one of which is illustrated in FIG. 6 in connection with the showing of an exemplary type of accelerometer which may be utilized with this invention. Accelerometer 11, which is identical except for its spatial orientation with accelerometers 12 and 13, may comprise a mass 170 slidably constrained to movement along its sensing axis Y by a bar 171 and spring restrained by spring 172. The accelerometer mass 170 of the bar and spring are mounted in case 173 which carries a potentiometer 174 energized by a suitable source of electrical energy 175 and including a wiper 176 carried by mass 170. Thus a voltage proportional to sensed acceleration may be derived from leads connected respectively to wiper 176 and a center tap of potentiometer 174. Case 173 may be filled with a suitable liquid to provide for damping. Assuming linearity of the spring and pickoff and negligible friction, the output voltage is proportional to acceleration. The gravity correction for the accelerometer output signal may be derived from a clock motor 177 which drives at constant speed, a cam 178 having the peripheral surface thereof cut in accordance with the predetermined function of altitude, horizontal distance and earth rotation. In case of the Y axis accelerometer 11, the gravitational correction due to earth rotation and horizontal distance is a function of the cosine of the vertical angle between the Y axis and the line to the center of the earth and may therefore be neglected. The cam 178 drives via cam follower 179 the movable arm 180 of a potentiometer 181 which is energized by a suitable source of electrical energy 182. A signal appearing across the arm 180 and the center tap of the potentiometer is thus the desired gravity correction. The accelerometer signal and the gravity correction signal are fed through suitable isolating amplifiers 183 and 184 to a summing amplifier 185 which provides an output signal proportional to the algebraic sum of the inputs thereof. The programmed gravity correction for each of accelerometers 12 and 13 may be derived from an arrangement identical to that shown in FIG. 6, with the exception of the configuration of the cam surfaces which are, of course, individually shaped for each accelerometer. Thus, a gravity correction programmer 190 is provided for accelerometer 12 to provide as output of summing amplifier 191, the corrected acceleration signal indicative of acceleration along the Z axis. Similarly, gravity programmer 192 has its output combined with the signal from accelerometer 13 in summing amplifier 193 to provide the X acceleration signal. The three acceleration signals are fed to computer 194 which may simply integrate each of the accelerometer signals once or twice to provide signals indicative of either velocity or distance components along the axes of the space fixed coordinate system defined by the two-axis gyroscopes. If desired, the computer may also interpret such velocity or distance components in terms of some particular coordinate system such as that based on a guidance plane which includes the launching point, the target and the center of the earth. If desired the computer may also effect cut-off of the vehicle power plant when a predetermined velocity component along the trajectory has been reached. It is to be understood that the specific details of the utilization of the corrected accelerometer signals may vary in accordance with the desired operation of the system as is well-known in the art.

There has been disclosed an inertial guidance system for detecting accelerations in a space fixed coordinate system which is particularly adapted to have a flexible physical arrangement of components so as to enable the most convenient mounting of the system in a vehicle. The flexibility of the system is derived from the provision of a plurality of relatively independent two-axis platforms, each individual to a single accelerometer. The several accelerometers are mutually independent and are carried on relatively movable supports which do not have to be mounted in either close proximity or in any particular physical relation other than the described orthogonal orientation. Each accelerometer support is individually stabilized by its own two-axis gyroscope to thereby eliminate the need for mounting all accelerometers together on a single three-axis platform.

Although the invention has been described and illustrated in detail, it is to be clearly understood that the same is by way of illustration and example only and is not to be taken by way of limitation, the spirit and scope of this invention being limited only by the terms of the appended claims.

I claim:

1. A navigation system comprising a plurality of platform assemblies; and means for releasably constraining said assemblies in a predetermined orientation relative to each other; each said assembly comprising a frame, a two-axis gyroscope having a rotor mounted on said frame with two degrees of freedom, means for slaving said frame to the spin axis of said rotor, acceleration sensing means on said frame for sensing motion of said frame in a direction parallel to said span axis, and means for mounting said frame for movement about two mutually orthogonal axes each perpendicular to said spin axis.

2. In an inertial guidance system for a craft, a set of three two-axis gyroscopes each gimballed for two degrees of freedom relative to the craft, means for initially constraining said gyroscopes in mutually orthogonal attitudes, and means for releasing said constraining means whereby an orthogonal set of inertial space fixed axes is maintained by the gyroscopes irrespective of maneuvers of said craft.

3. The system of claim 2 including a set of accelerometers stabilized by said gyroscopes with the sensing axes of said accelerometers respectively aligned with the spin axes of said gyroscopes whereby upon release of said constraining means said sensing axes are maintained in a mutually orthogonal relation irrespective of maneuvers of said craft.

4. A guidance system comprising a gyroscope having a rotor and a spin axis therefor; a frame, means for coupling said rotor and said frame for relative movement about a pair of mutually orthogonal axes each perpendicular to said spin axis, a support, means for mounting said frame on said support for movement about two mutually orthogonal axes each perpendicular to said spin axis, means for slaving said frame to said gyroscope, and means for decoupling said slaving means and slaving both said gyroscope and frame to a predetermined orientation.

5. A navigation system comprising a gyro having a rotor and a spin axis therefor, a frame, means for coupling said rotor and said frame for relative movement about a pair of mutually orthogonal axes each perpendicular to said spin axis, a support, means for mounting said frame on said support for movement about two mutually orthogonal axes each perpendicular to said spin axis, pickoff means for generating a pair of signals respectively indicative of said relative movement about each axis of said first mentioned pair of axes, means for torquing said gyro about each axis of said first mentioned pair of axes, motor means for effecting movement of said frame about each of said frame mounting axes, switch means for alternatively feeding each of said signals to one of said torquing and motor means, and means for selectively effecting restraint of said frame to said support.

6. A support; a plurality of platforms each comprising a frame mounted to said support for pivotal motion about two mutually perpendicular axes, a gyroscope having a rotor mounted to said frame for pivotal motion about said axes, said rotor having a spin axis perpendicular to said first mentioned two axes, means for maintaining alignment of said frame with said spin axis, acceleration responsive means carried by said frame for sensing translational motion along said spin axis; and means for releasably caging said platforms to said support in mutually different attitudes relative thereto.

7. Apparatus for measuring translational motion of a body movable through space with a combination of rotational and translational motion comprising, a plurality of accelerometers having mutually angulated sensing axes, a plurality of relatively movable supports each individual to a respective one of said accelerometers, each said support including means for mounting its associated accelerometer for two rotational degrees of freedom relative to said body, means for stabilizing each said accelerometer against motion in each of the two degrees of freedom thereof, and means for selectively slaving said accelerometers and said stabilizing means in an orientation having a predetermined relation to inertial space.

8. Apparatus for measuring translational motion of a body movable through space with a combination of rotational and translational motion comprising, a plurality of accelerometers having mutually angulated sensing axes, a plurality of relatively movable supports each individual to a respective one of said accelerometers, each said support including means for mounting its associated accelerometer for two rotational degrees of freedom relative to said body, and means for stabilizing each said accelerometer against motion in each of the two degrees of freedom thereof.

9. Apparatus for measuring translational motion of a body movable with a combination of translational and rotational motion comprising, a plurality of accelerometers on said body having mutually orthogonal sensing axes, a plurality of mutually independent stabilizing means each individual to a respective one of said accelerometers for stabilizing each accelerometer about each of a pair of mutually orthogonal axes, each of said last named axes being orthogonal to the sensing axis of the accelerometer individual thereto.

10. Apparatus for measuring translational motion of a body movable with a combination of translational and rotational motion comprising, a plurality of acceleration sensing devices on said body having mutually orthogonal sensing axes, a plurality of mutually independent two-axis gyroscopes each individual to a respective one of said devices and pivoted thereto for motion about each of a pair of mutually orthogonal axes, each of said last named axes being orthogonal to the sensing axis of the device individual thereto, a plurality of two-axis supports each individual to a respective one of said devices for mounting each device on said body with freedom of rotation about said pair of axes, and means responsive to relative motion of each device and its associated gyroscope about each of said pair of axes for effecting rotation of each said device relative to the gyroscope thereof.

11. Apparatus for sensing translational motion of a vehicle in the presence of rotational motion of such vehicle comprising a support adapted to be carried by said vehicle, a plurality of accelerometers having mutually orthogonal sensing axes, each said accelerometer being mounted to said support independently of each other accelerometer for pivotal motion about each of two axes which are orthogonal to each other and to the sensing axis of the individual accelerometer, and means for stabilizing each accelerometer against motion about each pivotal mounting axis thereof.

12. Apparatus for sensing translational motion of a vehicle in the presence of rotational motion of such vehicle comprising a support adapted to be carried by said vehicle, a plurality of relatively movable accelerometers having mutually orthogonal sensing axes, each said accelerometer being mounted to said support for pivotal motion about each of two axes which are orthogonal to each other and to the sensing axis of the individual accelerometer, and means for stabilizing each accelerometer against motion about each pivotal mounting axis thereof.

13. Apparatus for sensing translational motion of a vehicle in the presence of rotational motion of such vehicle comprising a support adapted to be carried by said vehicle, a plurality of accelerometers having mutually orthogonal sensing axes, each said accelerometer being mounted to said support independently of each other accelerometer for pivotal motion about each of two axes which are orthogonal to each other and to the sensing axis of the individual accelerometer, and a plurality of means each individual to a respective one of said accelerometers for stabilizing said accelerometers against motion about each pivotal mounting axis thereof, each said stabilizing means comprising a gyroscope mounted to an associated accelerometer for pivotal motion about said two axes thereof, and means responsive to said pivotal motion of said gyroscope for effecting rotation of the associated accelerometer about said two axes.

14. A three-axis navigation system comprising three accelerometers having mutually orthogonal sensing axes, three two-axis supports each mounting a respective one of said accelerometers for pivotal motion about a pair of mutually orthogonal axes each normal to the sensing axis of an associated accelerometer, three two-axis gyroscopes having mutually orthogonal spin axes and each individually pivoted to a respective one of said accelerometers about a pair of axes orthogonal to each other and to one of said spin axes, and a servo system maintaining alignment of each sensing axis with the spin axis of an associated gyroscope.

15. A navigation system comprising three accelerometers for sensing accelerations along a set of mutually orthogonal axes X, Y and Z, means mounting each accelerometer for pivotal motion about two axes of said set normal to its sensing axis, three gyroscopes having spin axes along said X, Y and Z axes respectively, means for caging said gyroscopes in an earth fixed orientation, means for disabling said caging means, and means including a portion of said caging means for aligning the X, Y and Z accelerometers with the X, Y and Z spin axes respectively when the caging means is disabled.

16. The system of claim 15 wherein said caging means includes means responsive to said X and Z accelerometers for leveling said gyroscopes and accelerometers about the Z and X axes respectively, and means for caging said gyroscopes and accelerometers to the accelerometer mounting means about the Y axis.

17. A guidance system comprising a plurality of relatively independent two-axis stable platforms each having gyro means for maintaining stable axes thereof, means for constraining said platforms and gyros in predetermined angular relations relative to each other, and means for releasing said constraining means whereby a set of stable axes is maintained by said stable platforms.

References Cited in the file of this patent

UNITED STATES PATENTS

| | | |
|---|---|---|
| 1,421,854 | Sperry | July 4, 1922 |
| 2,677,194 | Bishop | May 4, 1954 |
| 2,835,131 | Vacquier et al. | May 20, 1958 |